June 19, 1973   E. BLAICH ET AL   3,740,272
BATTERY IN MOLDED CASE AND COVER WITH ELECTROLYTE
RESERVOIR IN COVER COMMON TO ALL CELLS
Filed Nov. 25, 1970   2 Sheets-Sheet 1

INVENTOR
EMIL BLAICH
GERT NIEMANN

BY    *signature*

ATTORNEY

United States Patent Office 3,740,272
Patented June 19, 1973

3,740,272
BATTERY IN MOLDED CASE AND COVER WITH ELECTROLYTE RESERVOIR IN COVER COMMON TO ALL CELLS
Emil Blaich, Barienrode, and Gert Niemann, Hildesheim, Germany, assignors to Robert Bosch GmbH, Stuttgart, Germany
Filed Nov. 25, 1970, Ser. No. 92,782
Claims priority, application Germany, Jan. 29, 1970,
P 20 03 968.3
Int. Cl. H01m 1/02, 7/00
U.S. Cl. 136—162                                11 Claims

ABSTRACT OF THE DISCLOSURE

Battery in molded case with electrolyte reservoir in cover common to all cells. From the bottom of the reservoir tubes project downward dipping below the predetermined level of the electrolyte in each cell. Each tube is provided with a throttling device which can be shut-off tightly, and each cell is provided with a vent through which gas can escape during filing with electrolyte and during charge.

BACKGROUND OF THE INVENTION

Batteries are known in which each cell is connected to a common electrolyte reservoir; such batteries have the disadvantage that vibration occurring during motion of the motor vehicle in which the batteries are used causes continued flow of the electrolyte into the cells and the cells become overfilled. As a result of the drainage of the electrolyte reservoir, the operator comes to the conclusion that the battery has lost electrolyte as a result of electrolysis during overcharge and then fills the reservoir permaturely with water. The electrolyte level then rises in the cells and if the battery is subjected to strong vibration or overcharge, there is the danger that electrolyte will be ejected from the gassing vent and that damage will ensue.

SUMMARY OF THE INVENTION

It is an object of the present invention to devise a battery with an electrolyte reservoir, common to all the cells of the battery, so arranged that overfilling of the cells is prevented and damage outside of the battery by ejected electrolyte is avoided.

It is a further object of the invention to devise a battery which is free of moving control parts and free of complicated sealing elements.

The above objectives are achieved in accordance with the invention by joining tubular conduits to the bottom of the electrolyte vessel where one conduit dips into each cell and has a throttle nozzle therein and when the electrolyte reservoir has a sealing cover mounted thereon to the bottom of which are joined projections which, when the cap is in position, close off of the throttle nozzles. In order to bring the electrolyte level to the desired position in each of the cells, the tubular conduits are of such a length that they dip into the cell electrolyte by an amount which corresponds to the height of electrolyte in the electrolyte reservoir.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
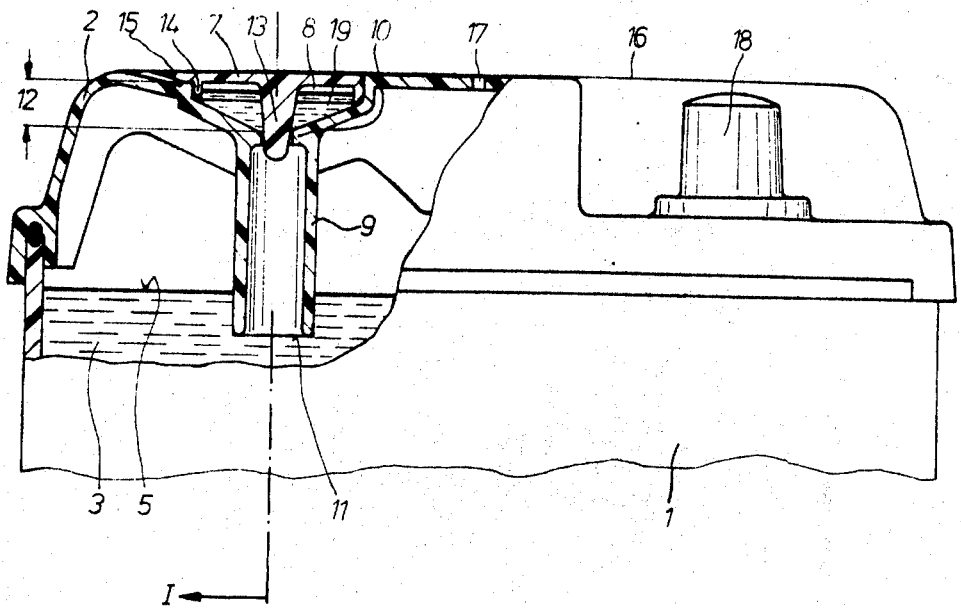
FIG. 1 shows a cross section through the upper portion of a battery in accordance with the present invention having an electrolyte reservoir common to all of the cells in the battery.
Figure 2:
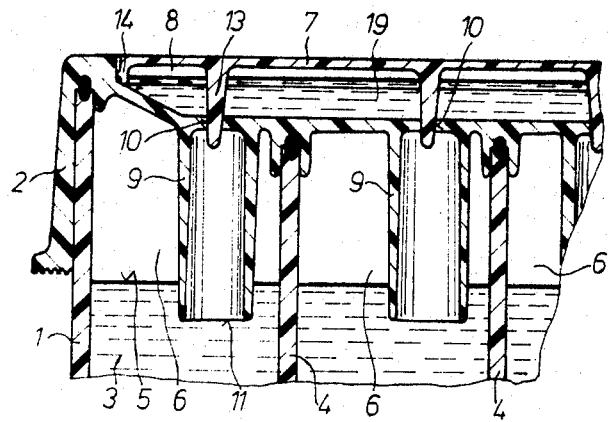
FIG. 2 shows a lengthwise section through the same region of the battery on the lines I—I in FIG. 1.

The battery case 1 shown in FIGS. 1 and 2 is molded of a synthetic resin such as polypropylene; the cover 2 is also molded of a synthetic resin such as polypropylene and is joined to the case by known processes such as cementing, heat-sealing or by the use of hardenable resins. The case contains the electrolyte 3; in order to simplify the figures, the cell packs with plate leads and the intercell connectors passing through the intervening walls 4 are not shown. The predetermined height 5 of the electrolyte 3 in the cell case 6 lies above the tops of the cell pack.

In the battery cover 2 is contained an electrolyte reservoir 8 covered with a sealing cap 7. The reservoir 8 crosses the tops of all of the cell vessels 6 and is common to all of the cell vessels 6. To the bottom of the electrolyte vessel are joined the circular conduits 9 the free ends 11 of which dip below the desired liquid level 5 of the electrolyte 3 by an amount approximately equal to the liquid height 12 of the electrolyte in the electrolyte reservoir 8. Each tubular conduit 9 is fitted with a throttle nozzle 10; the cross-sectional area of the tubular conduit 9 is about 80 mm.$^2$, and the cross-sectional area of the throttle nozzle 10 is only about 10 mm.$^2$. The walls of the electrolyte vessel are funnel shaped at the junctions with the throttle nozzles 10; the throttle nozzles 10 may also be termed orifices. When the sealing cap 7 is in position covering the electrolyte reservoir 8, the projections 13 mounted on the sealing cap 7 close off the orifice 10. The sealing cap 7 grips the electrolyte vessel 8 by means of the flange 14 with a sealing lip; it aslo has a tongue 15 which facilitates lifting the sealing cap 7 off the electrolyte reservoir 8 and the cap is so constructed that it lies essentially flush with the upper side 16 of the cover 2.

Each cell vessel 6 is provided with a vent 17 which can be seen in FIG. 1; FIG. 1 also shows a terminal 18.

To fill cells with electrolyte initially, the sealing cap 7 is opened, using an instrument such as a screwdriver to lift the tongue 15 and the electrolyte is poured into the reservoir 8. The air within the cells 6 leaves the cells through the vents 17. When the electrolyte reaches the opening 11 at the bottom of the tubular conduit 9 the air in the tubular conduit 9 is trapped and then compressed between the surface of the electrolyte 3 in the cell and the electrolyte 19 standing over the orifice. When the electrolyte level reaches the desired position 5 then the air pressure in the tubular conduit 9 will be such as to balance and support the electrolyte column 19 in the electrolyte reservoir 8. The pressure above and below the orifice will then be in equilibrium so that the flow of the electrolyte 19 into the cell 6 will have stopped. When the level of electrolyte in the electrolyte reservoir 8 stops dropping, then the level of electrolyte in all of the cells 6 will have the desired level 5.

The sealing cap 7 is then placed in position on the cover so that the projections 13 enter into and seal the orifices.

In this state, shaking of the vehicle or overcharge of the battery cannot cause electrolyte 19 in the electrolyte reservoir to enter the cell vessels 6 and consequently overfilling of the cells 6 with electrolyte 3 is prevented. Moreover, if the sealing cap is removed for inspection of the electrolyte level in the reservoir, no electrolyte will enter the cells from the electrolyte reservoir 8 if the cells 6 are still adequately filled.

Figure 3:
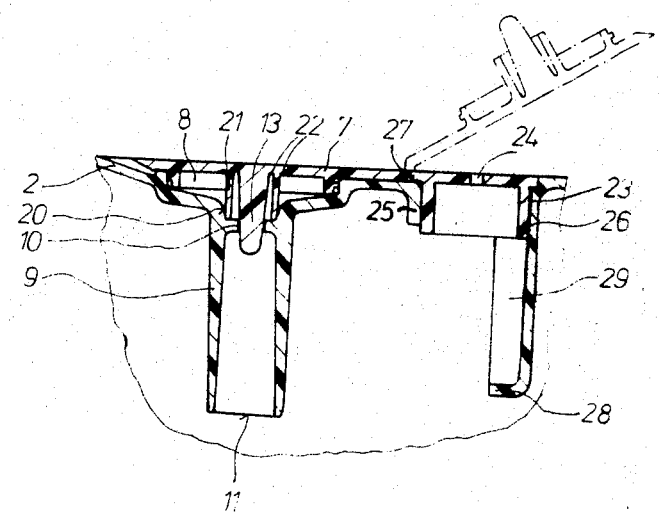
FIG. 3 shows a cross-section of a portion of the upper region of a battery in which the tubular conduits are joined at recesses to the electrolyte reservoir in the cover and in which the cover has a sealing cap joined hingewisely to one insert having a gas vent.

FIG. 3 shows an embodiment of the invention improved with respect to sealing the orifice, in which each orifice 10 lies within its own depression 20 in the electrolyte chamber 8. Moreover, the sealing cap 7 has a tubular section 21 surrounding the projection 13. The constrictions 22 at the root of the tubular section 21 provide increased flexibility.

FIG. 3 also shows a hinge-like connection of the sealing cap 7 with a vent-insert 23, this insert being provided with the opening 24 for the release of gas. The insert 23 is pressed like a stopper into the opening 26 which is provided with a collar 25. The slot 27 in the sealing cap 7 facilitates removal of the sealing cap; the position of the sealing cap in the open position is shown by means of the dot-and-dashed lines. The opening 26 in the cover to have an inside diameter of about 18 mm., which is large enough to permit the insertion of a hydrometer. The extended wall portion 29 of the collar 25 serves as an indication of the desired height of the electrolyte.

In accordance with a presently preferred embodiment, the inner cross-sectional area of said tubular conduit lies between 60 and 100 mm.$^2$ and the inner cross-sectional area of said orifice lies between 5 and 15 m.$^2$.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims.

We claim:

1. In a battery, a combination comprising a battery housing which is open at its top and subdivided into a plurality of cells; an electrolyte accommodated in each of said cells and filling said cells to a predetermined level; a cover formed with a single electrolyte reservoir and a plurality of downwardly extending tubular conduits each communicating with one of said cells, such conduit having a lower portion of a first cross-section and a upper throttling portion connecting said reservoir and said lower portion and having a second cross-section equal to only a small fraction of said first cross-section, each conduit extending downwardly to at least said predetermined electrolyte level when said cover is placed on top of said battery housing for closing the same; and closure means for blocking said throttling portion when said electrolyte is at said predetermined level whereby the flow of electrolyte through said throttling portion is prevented and said electrolyte reservoir is closed.

2. A combination as defined in claim 1 wherein said battery is a lead battery and said cover has therein openings corresponding in position and number to said cells, said openings permitting the escape of gas during filling of said cells with electrolyte and during charging of said battery.

3. A combination as defined in claim 1 wherein said tubular conduit projects into the electrolyte in said cells by an amount essentially equal to the depth of said electrolyte reservoir in said cover.

4. A combination as defined in claim 1 wherein said battery and cover consist of a molded synthetic resin.

5. In a battery as defined in claim 1, said throttling portion comprising an orifice within each of said conduits; and wherein said closure means comprises a removable cap adapted to be sealingly mounted on said cover with a surface thereof facing said cells, and a plurality of projections provided on said surface and corresponding in number to the number of said orifices each of said projections being configurated so as to be receivable in a respective one of said orifices to thereby substantially seal said one orifice against passage of liquid or gas therethrough when said cap is sealingly mounted on said cover.

6. In a battery as defined in claim 5, wherein each of said orifices is located in a depression in said electrolyte reservoir, and each of said projections is coaxial with a respective tubular conduit when said cap is sealingly mounted on said cover.

7. A combination as defined in claim 6, wherein said cover has an opening for each cell communicating the respective cell with the outside of the battery and positioned proximally to an associated tubular conduit; and further comprising a separate insert removably engageable in a respective opening, each of said inserts having an opening therein for permitting the escape of gas from the associated cell, and said cap being hingedly attached to at least one of said inserts.

8. A combination as defined in claim 5 wherein the inner cross-sectional area of said tubular conduit lies between 60 and 100 mm.$^2$ and the inner cross-sectional area of said orifice lies between 5 and 15 mm.$^2$.

9. A combination as defined in claim 5 wherein said removable cap lies essentially flush with the upper face of said cover.

10. A combination as defined in claim 5 wherein said removable cap is ringed about its perimeter with a lip and said cover has a flange which grips said lip sealingly.

11. A combination as defined in claim 2 wherein said reservoir, at the entrance to each of said orifices, is funnel shaped.

References Cited

UNITED STATES PATENTS

| | | | |
|---|---|---|---|
| 1,304,894 | 5/1919 | Liebreich | 136—162 |
| 3,485,678 | 12/1969 | Blaich et. al. | 136—162 |
| 2,176,173 | 10/1939 | Fuller et al. | 136—162 |
| 2,692,905 | 10/1954 | Fischback et al. | 136—166 |

OTHER REFERENCES

| | | | |
|---|---|---|---|
| 350,285 | 6/1931 | Great British | 136—162 |

DONALD L. WALTON, Primary Examiner

U.S. Cl. X.R.

136—170, 178